Patented Dec. 14, 1948

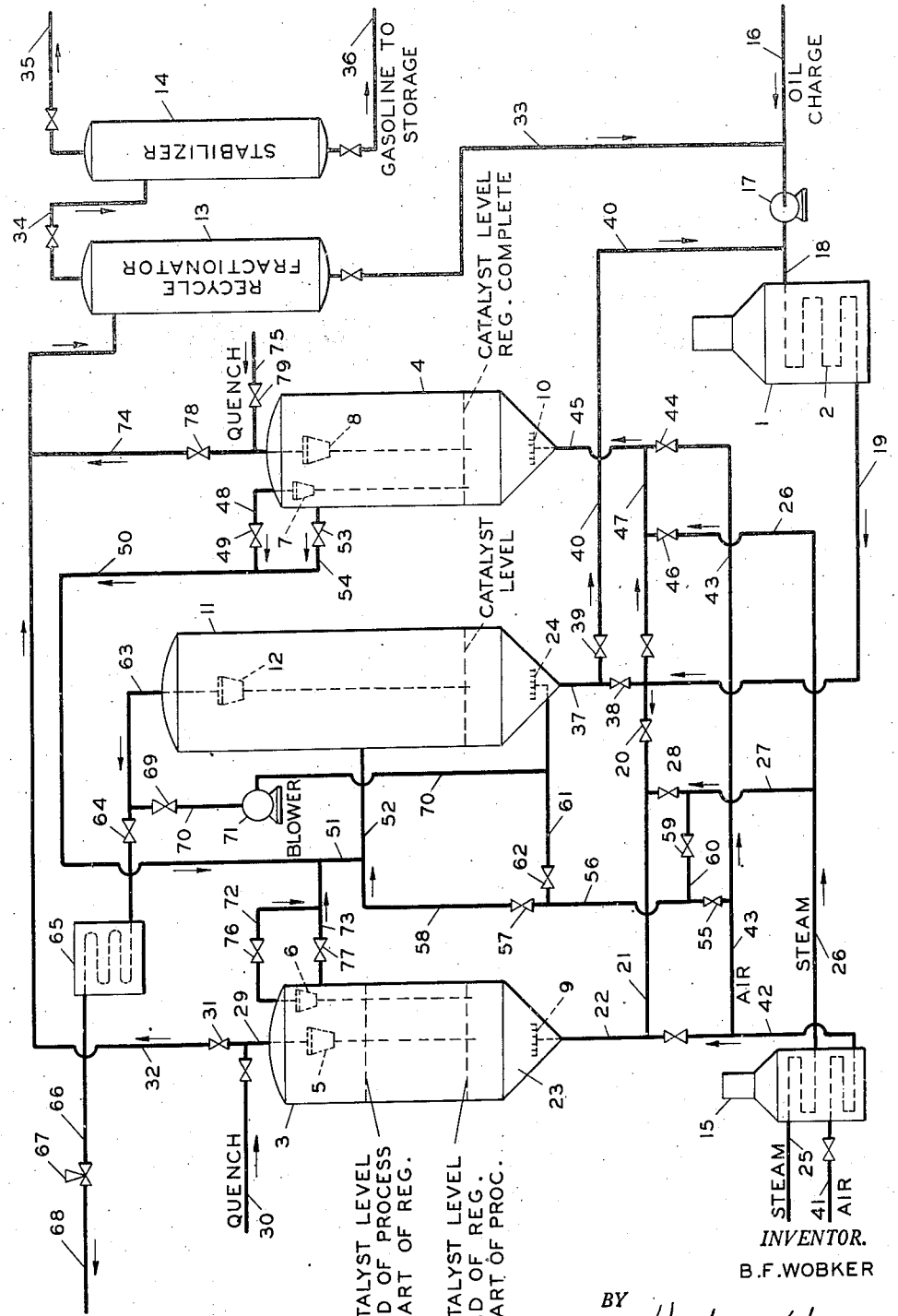

2,456,035

UNITED STATES PATENT OFFICE 2,456,035

TREATMENT OF FLUIDS WITH COMMINUTED SOLIDS

Burle F. Wobker, Mission, Kans., assignor to Phillips Petroleum Company, a corporation of Delaware Application January 2, 1948, Serial No. 222

11 Claims. (Cl. 196—52)

This invention relates to the treatment of organic fluids with solid contact materials. In one specific embodiment the invention has particular application to the catalytic treatment of hydrocarbons wherein a finely divided solid catalyst is employed which becomes coated with carbonaceous matter, which matter is periodically removed from the catalyst by oxidation. The invention has particular though not exclusive utility in the catalytic cracking of hydrocarbon oils to form lower boiling hydrocarbons, and will be described with specific reference thereto in a preferred embodiment.

The cracking of hydrocarbons in the presence of catalysts has long been known. One of the standard methods is to deposit the particles of catalyst in the form of a stationary bed within a reaction vessel and to pass the charge stock, preheated to cracking temperatures, through the bed of catalyst under conditions effecting the desired cracking reactions. When a gas oil, for example, is being cracked to form gasoline, certain other products are also formed including light gases and a very heavy carbonaceous material which is deposited on the catalyst particles and which is frequently designated as "coke," although this latter material probably consists of a mixture of free carbon with hydrocarbons of high molecular weight having a low hydrogen to carbon ratio. This deposit causes what is apparently a loss in activity of the catalyst, as evidenced by a decrease in production of desired products, and after a period of time the extent of reaction becomes sufficiently impaired as to require a stopping of the cracking reaction for the purpose of reactivating the catalyst. To this end the flow of hydrocarbon vapors is stopped, the cataylst bed is purged with steam or other inert gas, and an oxygen-containing gas, such as air, is then passed through the catalyst bed to burn off the carbonaceous deposits and thus reactivate the catalyst. This reactivation or regeneration treatment must be conducted with considerable caution in order to avoid overheating the catalyst, since most siliceous cracking catalysts cannot withstand temperatures above about 1150° F. without being permanently impaired in activity, while even the most rugged catalysts, such as bauxite, must not be allowed to attain a temperature in excess of 1400 to 1500° F. during reactivation. After part or all of the carbon has been removed the chamber is purged of oxygen-containing gases and the catalyst bed is again employed for the cracking reaction. When using such a stationary bed at least two catalyst chambers are ordinarily employed so that one is always available for on-stream processing flow while the other is being reactivated.

More recently there have come into common use the so-called mobile catalyst systems in which the catalyst is caused to flow continuously in a cycle which includes flow through a reaction chamber and a reactivation chamber. There are two principal types, one being the so-called "TCC" process in which catalyst particles of considerable size are moved downwardly through the reaction chamber in the form of a slowly moving bed, and are then lifted by mechanical means to the top of a regenerator through which they again flow in the form of a moving bed; the thus reactivated catalyst is then transferred to the top of the reactor for another cycle. The other principal method is known as the "fluid" cracking process, in which the catalyst is employed in the form of a fine powder. This powdered catalyst is maintained in the reactor and in the regenerator as a suspension in gases, and is moved through the system in a cycle which includes the reactor and the regenerator while suspended in various gaseous streams. The catalyst may either be suspended in the reactants and regeneration gas and carried upwardly or even horizontally at about the same rate of flow as the gases, or it may be maintained in the respective chambers in the form of a "fluidized" bed, the latter being more common. In the fluidized bed method of operating, relatively large bodies of catalyst are maintained in the reactivation and the reaction chambers in an aerated condition, and catalyst is continuously being added to and removed from each bed for passage to the other chamber. The catalyst within each chamber is in a turbulent condition somewhat resembling a boiling liquid, and there thus exists within the chamber a dense turbulent phase of catalyst suspended in gases, above which is a gas phase containing a much smaller amount of catalyst which happens to be carried out of the dense phase by the up-flowing gases. The gases leaving the chamber are ordinarily passed through one or more cyclone separators or other means for separating the residual catalyst from suspension in the gases.

In the fluidized bed technique the catalyst itself is relied on to carry the heat of regeneration into the reaction chamber to supply the endothermic heat of the cracking reaction. In order to carry sufficient heat, and also in order to minimize over-heating in the reactivation zone, a relatively large quantity of catalyst is continuously circulated as compared to the minimum amount which would be required for effecting the desired amount of cracking. Furthermore, because of the uniform mixing of just-introduced spent catalyst particles with the entire body of catalyst in the reactivation zone, the "reactivated" catalyst withdrawn therefrom is necessarily a mixture of catalyst particles in all stages of reactivation, and has the same carbon content as the average of all the catalyst within the reactivation zone. Thus, in a typical example, catalyst having an average carbon content of 3 weight per cent will be continuously withdrawn from the reactor and introduced into the reactivation zone; the average carbon content is therein lowered to 1 per cent, and it is difficult or impractical to carry out the reactivation in such a way as to produce a reactivated catalyst with a carbon content appreciably lower. Similarly, the conversion is always carried out in the presence of a mixture of catalyst particles not only of low, but also intermediate and high carbon content, and necessarily the average carbon content of the catalyst in the converter is far above even that of the reactivated catalyst introduced thereto. There is, however, an advantage over fixed bed operation in that the catalyst in the reactor is always of the same average activity and accordingly a very uniform product is obtained over a long period of time.

One of the principal drawbacks of a fixed bed type of operation lies in the variation in catalyst activity from the beginning of a process period in a cycle to the end of that period. Thus, in the beginning when the catalyst has been freshly reactivated there may be practically no carbon on the catalyst which will accordingly have the greatest activity. As the reactivation proceeds the catalyst becomes less active due to the deposition of "coke," and it is economically necessary to continue the conversion until the activity has decreased quite considerably. This decrease in activity not only results in a lowered per-pass conversion but may also cause a marked change in product characteristics. The resulting variations in quantity and quality of product introduce operating difficulties with respect to fractionation and with respect to product quality control.

It has heretofore been suggested to combine certain features of the stationary bed and fluidized bed procedures and this has been accomplished by merely providing a body of powdered catalyst in each of two chambers, together with suitable cyclone separators and other means for retaining the catalyst within the chambers, and then alternating each chamber on conversion and on reactivation, in exactly the same manner as if a stationary bed of catalyst rather than a fluidized bed were within each chamber. While better heat control and other advantages are thus obtained, a number of the disadvantages of each method still remains, including the decrease in catalyst activity just mentioned.

While the foregoing discussion has been directed specifically toward catalytic cracking of hydrocarbon oils, it will be understood that the problems are similar for the various other conversions and treatments of organic fluids which are carried out in the presence of solid contact materials, including catalysts, under conditions causing laydown of carbonaceous matter on the contact material which must be removed by burning off or otherwise. Examples of such conversions are well known to those skilled in the art and include catalytic reforming of gasoline-boiling-range stocks to improve the octane number thereof, catalytic desulfurization of similar materials, dehydrogenation of paraffins and/or olefins either normally liquid or normally gaseous, the cyclization or aromatization of hydrocarbon materials, various alkylations including the alkylation of aromatic hydrocarbons and of phenolic compounds with olefins, alcohols and alkyl halides, catalytic dehydration of oxygenated organic materials, and dehydrohalogenation of organic halides, as well as the simple treatment of organic fluids with solid adsorbents to remove a component therefrom either by simple adsorption or a combination of physical adsorption and chemical reaction such as polymerization, the latter combination effect being exemplified by the clay treating or refining of cracked gasolines. The Fischer-Tropsch synthesis wherein carbon monoxide is reacted with hydrogen to form hydrocarbons and oxygen-containing organic compounds in the presence of a powdered catalyst such as reduced iron, may be performed in accordance with this invention, the catalyst which becomes deactivated by wax deposits being reactivated not by oxidation but by treatment with hydrogen at elevated temperatures, such as from reaction temperature up to 800° C. The principles of the invention are broadly applicable not only to organic conversions wherein carbon deposits cause deactivation of catalyst, but likewise to any conversion or treatment of fluids by solid contact materials, which term includes among other materials any solid catalyst, under conditions that cause fouling of the contact material in any way resulting in decreased activity and requiring reactivation in order to maintain an active contact material. For example, in the dehydration of alcohols to form olefins in the presence of silica gel, alumina, or active clays, the activity of a used catalyst which has become hydrated can be increased by merely heating at an elevated temperature to dehydrate same.

It is an object of the present invention to provide improvements in the treatment of fluids in the presence of a mass of subdivided solid particles which became deactivated and require reactivation. It is another object of this invention to improve the operation of catalytic hydrocarbon conversions. A further object of the invention is to effect the treatment of hydrocarbons with a powdered catalyst. Yet another object is to combine certain principles of the fluidized bed technique and the fixed bed technique in the catalytic conversion of hydrocarbons in such a way as to obtain further advantages not available by the practice of either method alone. A still further object of the invention is to employ intermittent conversion and reactivation steps within a single chamber while yet maintaining a substantial constant catalyst activity through the conversion step. A further object is to minimize the circulation of powdered catalyst through a conversion system of the type described. Yet another object is to obtain improved carbon removal from a powdered catalyst. Further objects and advantages of the invention will be apparent, to one skilled in the art, from the accompanying disclosure and discussion.

Briefly stated, one preferred embodiment of my invention involves the use of two similar chambers each containing a body of powdered catalyst, each chamber being used alternately on conversion and on reactivation, together with a third auxiliary catalyst storage chamber into which reactivated catalyst is periodically passed and out of which fresh or reactivated catalyst is periodically passed to the chamber which is on conversion at the time. The conversion step is initiated in one chamber containing only a part of the total catalyst which is ultimately to be used therein, for example one-third. This catalyst is fresh catalyst which has just been reactivated within the conversion chamber itself. The flow of hydrocarbon oil to be cracked or converted is initiated, and either immediately or after a period of time, the addition to the chamber of further amounts of catalyst is started. As the conversion proceeds in this chamber, sufficient catalyst is added in a continuous or substantially continuous manner to maintain an adequate average activity of the catalyst in the conversion chamber. The catalyst within the chamber is maintained as a fluidized bed at all times, and the level of that bed gradually rises due to the addition of catalyst. The conversion thus continues with the addition of catalyst to the fluidized bed until the catalyst level has risen to a predetermined maximum. The conversion step may then be stopped or may be continued for a period of time until the average catalytic activity decreases somewhat. Preferably, however, the catalytic activity and accordingly the per-pass conversion is maintained within narrow limits throughout the conversion step. While this has been going on, catalyst in the other chamber has been undergoing reactivation as will be described below.

At the end of the conversion step in the particular chamber under discussion, the oil charge is diverted to the other chamber which now contains a minimum level of reactivated catalyst, where conversion is carried out in a manner similar to that just described with reference to the first chamber. The first chamber is then purged of hydrocarbons by steam or other inert gas and reactivation of the catalyst contained therein is started. The reactivation is accomplished by passage of air or other oxygen-containing gas through the bed of catalyst which is still maintained in a fluidized condition. The reactivating gases are passed through the catalyst until the carbon content thereof has been reduced to any desired value, which preferably approaches zero. The gas velocity is preferably maintained only sufficient to keep catalyst in suspension within the reactor, at least during the first portion of the regeneration step. After the regeneration is complete, or after the regeneration is, say, half complete, the flow rate of gases is increased sufficiently to carry substantial amounts of catalyst upwardly out of the dense fluidized phase. At that time the effluent reactivation gases are passed directly from the said first chamber into the supplementary catalyst storage chamber and the catalyst thus carried in suspension is separated therein from the reactivation gases and stored for future use. This separation may be accomplished not only in the storage chamber, but also or instead outside the chamber as desired by any suitable means. The flow of gases plus suspended catalyst is continued until sufficient catalyst has been carried out of the chamber under reactivation and into the storage chamber to lower the catalyst level in the first chamber to the desired minimum for initiation of the next conversion step therein. When this catalyst-carrying-out procedure is started before reactivation is complete, the reactivation continues concomitantly, and additional reactivating gases may be introduced into the conduit which is carrying the catalyst from the one chamber to the other in order to complete the regeneration of that portion of catalyst which is being carried over. Additionally or alternatively, reactivation may be continued within the catalyst storage chamber itself, either by means of reactivation gases in which the catalyst is carried or by means of additional oxygen-containing gases introduced into the bottom of the storage chamber. In any event, this portion of the cycle is complete when the level of reactivated catalyst within the first chamber reaches a predetermined minimum. At that time the first chamber is ready to be purged and placed again in conversion service. If the conversion step has been completed in the second chamber by this time, then the first chamber is immediately purged and the oil charge is diverted into that chamber. If the second chamber is still usable for conversion, the first chamber is merely purged and the catalyst maintained therein in a fluidized condition by the use of steam or other inert gas until the time for its use arises. In some instances it may be desired to cool the catalyst remaining in the first chamber from the reactivation temperatures to a temperature more nearly corresponding to the desired conversion temperatures, and such cooling may be accomplished by passage of steam or other inert gas through the body of catalyst.

When the first chamber is put back on conversion, the catalyst in the second chamber is then subjected to reactivation in the manner just described.

It will be apparent from the foregoing that rather than allowing the catalyst within a given chamber to decrease in activity until the conversion must be stopped, the activity is maintained by means of added fresh catalyst which is continuously being introduced into the chamber along with the hydrocarbon feed. In this way the entire conversion step may be carried out with a fixed catalyst activity, or with a catalyst activity which is allowed to vary over only narrow limits. This can be accomplished with a minimum of catalyst circulation through the system, as compared with the usual fluid catalyst technique, due to the complete reactivation which is accomplished by my process. In this way a very desirable combination of advantages of the fixed bed operation and of the fluid catalyst operation is obtained while avoiding certain disadvantages of each.

For the purpose of explaining the invention in further detail, reference is made to the accompanying drawing which is a diagrammatic flow sheet of the process and equipment adapted to practice the invention set forth herein. It will be appreciated that numerous items of equipment, such as pumps, blowers, valves, controls, heat exchangers, and the like, can readily be supplied by one skilled in the art for any particular situation, and therefore, no attempt has been made to show all such items in the drawing.

Numeral 1 designates a typical charge stock preheater and vaporizer containing the commonly known radiation and convection tube banks 2. Numerals 3 and 4 designate vertically disposed catalytic reactors or converters, commonly cylindrical in form, each of which may be equipped with a conical or otherwise shaped bottom. Each reactor is thoroughly insulated, either internally or externally, and may advantageously be lined with a corrosion- and abrasion-resistant material. Influent fluid distributing means 9 and 10 may be of any known type or may be omitted altogether. The size of the reactors may vary within wide limits depending upon the type of charge stock, catalytic contact time, amount of catalyst used, amount of catalyst circulated, and other known factors. For example, the diameter may vary from 3 to 20 feet while the height may vary from 10 to 50 feet. A preferred reactor is 10 feet in diameter by 34 feet in height with a dished head and a frusto-conical bottom. In the top of each reactor, 3 and 4, are situated centrifugally-acting dust separators, 5, 6, 7 and 8, which may be of the well-known cyclone type and whose purpose is to render substantially catalyst-free the gaseous streams leaving the reactors. Numeral 11 indicates a hopper for regenerated catalyst, cylindrical in form with a conical bottom, whose function is to serve as a catalyst surge tank as will be hereinafter explained. A dust separator, 12, similar in type and function to those located in the top of the reactors is situated in the top of the catalyst hopper 11 to separate catalyst fines from effluent reactivation product gas. The hopper should be adequately insulated in order to minimize cooling of the hot catalyst contained therein and may, if necessary, be equipped with reactivation gas distributing means 24 in its bottom to provide for efficient contact of regenerating gas or hot spent regeneration gas with the temporarily stored catalyst. The furnace 15 is a steam and reactivation gas preheater similar in design and function to the oil preheater 1.

For the purposes of this description it will be considered that reactor 3 is on process flow while reactor 4 is on reactivation flow although it is to be understood that the reactors 3 and 4 actually are cyclically alternated on periods of process flow and regeneration flow so as to permit a continuous processing of hydrocarbons charged to the apparatus. The hydrocarbon charge stock, selected from one or more of the types herein described, is charged to the conversion step through the line 16, pump 17 and line 18 to the vaporizing coils 2 located in oil preheater 1 and thence through line 19, valve 20, line 21, line 22 and distributing means 9 to reactor 3. Immediately after reactivation reactor 3 contains from one-fourth to three-fourths, and preferably about one-half, of the total catalyst required for the process period to be effected in reactor 3. Just before starting introduction of charge stock, the hot catalyst in reactor 3 may be and preferably is cooled somewhat below the reactivation temperature by introduction of steam through line 25, preheater 15 (which may be by-passed for this purpose if desired), lines 26 and 27, valve 28, lines 21 and 22, and distributor 9. This also serves to purge any oxygen from the catalyst bed. Such stream is also used to maintain a fluidized catalyst bed within the reactor during whatever period of time elapses between reactivation and conversion on-stream periods. The hydrocarbons are cracked, or other charge stock subjected to a desired reaction, in the fluidized catalyst bed in reactor 3. Gaseous reaction products pass through cyclone separator 5, line 29 (into which is introduced cool quench liquid from valved line 30), valve 31 and line 32 into fractionating column 13, wherein recycle stock plus entrained catalyst is recovered as a bottoms product for return to the process via lines 33 and 16, while gasoline and lighter products are taken overhead via line 34 into stabilizing column 14. Light gases are removed through line 35 and the gasoline product is recovered through line 36. Of course, units 13 and 14 may comprise more than single fractionators, but the various means of handling products and preparing materials for recycle are well understood in the art and need not be discussed in further detail.

Either immediately upon starting flow of gas oil vapors into reactor 3, or after conversion has been effected therein for a time, fresh hot reactivated catalyst (purged of residual reactivation gases by steam or by other conventional method not shown) is fed into the reactor, either directly by means not shown, or preferably into the oil being charged, as by line 37, and catalyst flow rate control valve 38, into line 21 which is carrying the preheated oil into the reactor. The thus-introduced catalyst provides additional preheat to bring the oil up to reactor inlet temperature and supply the endothermic heat of reaction. An alternative, though usually less desirable, method is to pass the catalyst removed from the bottom of hopper 11 by way of line 37 into the oil in line 18 ahead of preheater 1, by means of valve 39 and line 40.

During most or all of the time, catalyst is being thus removed from hopper 11, additional catalyst is being introduced into said hopper from the other reactor 4 which is on regeneration, so that the catalyst level in hopper 11 tends to stay fairly constant for the greater part of each cycle. The catalyst in reactor 4, which is at a predetermined maximum level when its reactivation is initiated, is first purged of residual hydrocarbons by passing steam therethrough and is then contacted with air from line 41, heater 15, lines 42 and 43, valve 44, line 45 and distributor 10. Steam may also be introduced from line 26 through valve 46, line 47, and line 45 thence through distributor 10. Spent reactivation gases are passed through one or more cyclone separators 7 which recover most of the entrained catalyst and return it to the fluidized bed, and the gases then pass through line 48, valve 49, line 50, line 51, and line 52 into hopper 11, preferably tangentially to aid in separating any quantities of catalyst being carried in the gases. During all, or only the latter part, of the reactivation period the gas velocity in reactor 4 is sufficiently high to carry part of the catalyst out of the fluidized bed by entrainment, and during such time valve 49 is closed and valve 53 in line 54 is open so that cyclone separator 7 is by-passed. Additional air can be introduced via line 43, valve 55, line 56, valve 57, and line 58 into line 52 for increasing gas velocity in the latter conduit and/or effecting further catalyst reactivation therein and in hopper 11. Steam can also be supplied in the same manner by means of valve 59 and line 60. Alternatively or additionally, air and/or steam may be withdrawn from line 56 by means of line 61 and valve 62 and passed into the fluidized bed of catalyst in hopper 11 by way of distributor 24 to reactivate same further and/or to maintain same in fluidized condition. Reactivation gases ultimately pass through unit 12 which comprises one or more cyclone separators and then out through line 63, valve 64, cooler or heat exchanger 65, line 66 and valve 67 to vent 68; a portion may be recycled via valve 69, line 70, blower 71 and line 61 to the distributor 24 to aid in fluidization.

When from half to two-thirds or even more of the catalyst has been transported out of reactor 4, the latter is ready to be purged and put on stream for conversion. This is done as soon as reactor 3 has been filled with catalyst to a predetermined maximum level and that catalyst has been used to the desired extent. The operation of the two reactors is then reversed, so that conversion is effected in unit 4 as described above with respect to unit 3, while unit 3 is on stream for reactivation in a manner similar to that described above with respect to reactor 4. The use of the various other lines and valves and other elements of equipment, including lines 72, 73, 74 and 75 carrying valves 76, 77, 78 and 79, respectively, will be obvious from the foregoing.

The following data are given as typical of the practice of my invention in the catalytic cracking of a gas oil to produce motor fuel. First presented are specific figures for a single continuous run, followed by a recitation of broader ranges of conditions utilizable for such a conversion. However, it is to be understood that this information is by way of example only, inasmuch as considerable variation in flow rates, temperatures, quantities of catalyst, times required for conversion and reactivation, and the like, may readily be made by one skilled in the are in adapting the principles of the invention to given feed stocks, conversions, catalysts, and plant capacities.

A Mid-Continent base stock of 38° A. P. I. virgin gas oil with a 750° F. end-point is selected as a charging stock for conversion to a commercial motor-type gasoline. The process cycle is begun by pumping the selected stock to an oil preheater at the rate of 250 barrels per hour when it is preheated from an inlet temperature of 400° F. to an outlet temperature of 890° F. at an outlet pressure of about 12 pounds per square inch age. In order to assist in heating the oil and minimize coke formation in the preheater, about 20 pounds of steam per barrel of oil is injected into the oil at a midpoint in the preheater coil. The oil preheater is designed to assure almost complete vaporization with a minimum residence time and, consequently, a minimum of thermal cracking. (In many instances it is preferred to accomplish only partial vaporization, with the hot catalyst supplying sufficient heat to complete the vaporization.) The vaporized charge stock is transferred to the bottom of a catalytic reactor containing about 37,500 pounds of newly regenerated acid-treated clay cracking catalyst of 50 microns average diameter and 200 mesh maximum size distributed in a bed 5 feet in depth. The transfer lines between the oil preheater and the catalytic reactor are sized to give a 20 feet per second vapor velocity under the conditions set forth above. The catalytic reactor is sized to allow a 1.3–1.5 feet per second vapor velocity through the catalytic mass thereby insuring a fluidized condition of the catalyst therein with a minimum of catalyst carryover.

The hot reactivated catalyst in the catalytic reactor is first cooled with steam to a temperature not much above the desired reaction temperature, say down to 925° F. The reactor is operated at 10 pounds per square inch gage. The converted hydrocarbon products are separated from the catalytic mass in the lower part of the catalytic reactor after which they pass through a cyclone type dust remover wherein most of the entrained catalyst is auto-centrifugally separated and returned to the fluidized catalyst mass. The hydrocarbon vapors are quenched to 650° F. immediately upon leaving the cyclone separator by injecting quench water into the transfer line. The 650° F. vapors are then passed to a fractionation step wherein the unconverted charge stock boiling above 400° F. is separated from the lighter products, the former being returned with entrained catalyst as a catalyst slurry recycle to the oil preheater inlet. The lighter hydrocarbon products are separated into butane-free 400° F. end-point gasoline and other products including light gases such as hydrogen, methane, ethylene and ethane, and $C_3$ and $C_4$ paraffins and olefins. Hot (1150° F.) reactivated catalyst is continuously added from the catalyst hopper to the catalytic reactor via the inlet hydrocarbon transfer line at the rate of 0.5 pound of catalyst per pound of oil. This addition maintains the overall activity of the catalyst in the catalytic reactor at the desired level corresponding to a per pass conversion of 50 per cent and, at the same time, preheats the hydrocarbon feed from 890° F. to 925° F., thereby assuring a constant and adequate reaction temperature above 900° F. and below 925° F.

When the reactor has been on stream for one hour, sufficient catalyst (about 37,500 pounds) has been added from the catalyst hopper to fill the reactor to such a level that further addition is undesirable and, hence, the reactor is removed from process duty for regeneration, the hydrocarbon charge being diverted to another catalytic reactor for continuing the conversion in a like manner as above.

The 75,000 pounds of "spent" catalyst in the catalytic reactor after the one hour process period contains 3.0 weight per cent carbon, which is removed by oxidation. About 340,000 cubic feet (S. T. P.) per hour of air compressed to 50 pounds per square inch gage and 85,000 pounds per hour of steam are mixed and preheated to 700° F. at 50 pounds per square inch gage in a reactivation gas preheater. The hot reactivation gas is throttled to 30 pounds per square inch gage and admitted to the bottom of the catalytic reactor containing the spent catalyst, and, as the gas is passed upward through the reactor at a vapor velocity of 1.3–1.5 feet per second, the catalyst is maintained in a fluidized condition enabling a thorough burn-out of the deposited carbon at a maximum regeneration temperature of 1150° F. The products of combustion are separated from entrained catalyst by cyclone separators situated in the top of the reactor and in the top of the catalyst hopper after which they are passed in heat exchange relationship with the hydrocarbon charge stock and then released to the air.

After about 40 to 50 minutes of regeneration under the conditions described above, the carbon content of the catalyst has been reduced from 3.0 to 0.3 weight per cent. In order to transfer 37,500 pounds of accumulated catalyst from the reactor to the catalyst hopper, the effluent regeneration gas is by-passed around the cyclone separator in the top of the reactor directly to the catalyst hopper and the regeneration gas rate to the preheater is then progressively increased to transport over to the storage hopper the desired amount of the catalyst, i.e. 37,500 pounds. About 50,000 cubic feet per hour of air and 12,500 pounds per hour of steam, preheated as a mixture to 700° F. are also injected into the bottom of the catalyst hopper and into the catalyst transfer line between the reactor and the hopper to insure an adequate catalyst-carrying vapor velocity therein and to complete the combustion of carbon remaining on the catalyst. This additional burning also insures the maintenance of the desired 1150° F. catalyst temperature in the catalyst hopper. The final carbon content of the reactivated catalyst is 0.2 weight per cent. As this reactivation is going on, catalyst is being fed from the reactivated catalyst hopper into the other converter wherein the cracking reaction is continuing. Such reactivated catalyst is purged with steam before being passed to the converter. When reactivation is completed, the flow of air is cut off and the reactor, as well as the reactivated catalyst hopper if desired, is purged with steam prior to reintroduction of hydrocarbon feed thereto.

It will be appreciated that the foregoing data represent only one preferred set of conditions for use in catalytic cracking of gas oil. Other suitable cracking stocks include all heavy residual oils such as virgin and cracked gas oils or topped crude oils; such stocks may boil within the range of 400 to 1000° F. and higher, and will usually have a gravity ranging from 20 to 40° A. P. I. Cracking temperatures depend to a certain extent on the particular charge stock and catalyst used, and range from 850 to 1100° F. From 0.5 to 10 parts of catalyst per part (by weight) of oil may be used. While any of the known cracking catalysts may be employed, the synthetic and natural composites of silica with minor amounts of alumina are preferred; bauxite is also an effective and desirable catalyst. Catalyst is used in the form of a powder, which term includes any particle size such that the catalyst may be kept suspended in gases in the reactor and reactivation as described. The length of one complete cycle may vary from one hour or less to 10 hours or more, depending largely on the amount of carbon laid down on the catalyst. This latter figure will be from one to 10 per cent by weight of the catalyst for most oils and conditions of cracking.

Inasmuch as the selection of specific catalysts, and specific conditions for reaction and for catalyst reactivation, is well within the skill of the art for any particular conversion or treatment, it is not necessary to specify same in further detail here. The principles of the invention are applicable to any process wherein a carbonaceous fluid is contacted with a solid contact material under conditions causing deposition thereon of carbonaceous matter which is removable by oxidation. Though the invention has been described by particular reference to preferred embodiments, changes may be made by those skilled in the art in the materials and conditions disclosed without departing from the scope of the invention as defined in the appended claims.

I claim:

1. In the treatment of organic fluids with a finely divided solid contact material in which treatment carbonaceous matter is deposited on said material, is removed therefrom by oxidation, and the material is then reused in said treatment, the improvement which comprises maintaining a fluidized mass of said material within each of a plurality of treatment-reactivation zones, maintaining a fluidized mass of reactivated contact material within a storage zone, passing an organic fluid to be treated into one of said treatment-reactivation zones containing a predetermined minimum quantity of said contact material in a fluidized state under conditions effecting the desired treatment, introducing into said zone additional quantity of reactivated contact material from said storage zone while passing said fluid therethrough thereby gradually increasing the quantity of contact material within said zone while minimizing the average carbon content of the contact material therein, then when the quantity of contact material within said zone has increased to a predetermined maximum diverting the flow of fluid to be treated into another of said treatment-reactivation zones containing a predetermined minimum quantity of contact material therein, continuing the treatment in said other zone in the manner just described with introduction of reactivated contact material thereinto from the said storage zone, while continuing treatment of said fluid in said another zone subjecting the contact material in the first said zone to reactivation by passing therethrough an oxidizing reactivation gas under conditions effecting removal of carbonaceous matter from the contact material by oxidation, continuing said reactivation of the catalyst remaining in said first zone for a sufficient period of time to effect a reduction of the carbon content to a desired extent, during said reactivation period transferring a substantial portion of the catalyst from said first zone into said storage zone to decrease the quantity of contact material in said first zone to the aforesaid predetermined minimum, and thereafter passing said fluid to be treated into said first zone for treatment therein and repeating the cycle as described.

2. The method of claim 1 in which said contact material is transferred from said first treatment-reactivation zone into said storage zone by increasing the rate of flow of gases upwardly through said first zone to carry contact material in suspension therein, and recovering the thus-suspended catalyst from the gaseous effluent from said first zone and accumulating the thus-recovered contact material in said storage zone.

3. The method of claim 2 in which the suspension of contact material in effluent reactivation gases is passed into said storage zone for separation of the contact material therein, and in which additional quantities of oxidizing reactivation gases are introduced into said suspension at a point between the said first zone and the said storage zone for effecting further oxidation of carbonaceous matter from said suspended contact material.

4. The method of claim 2 in which contact material accumulated in said storage zone is subjected to further reactivation by passage of oxygen-oxidizing reactivation gases through the contact material maintained in a fluidized condition in said zone.

5. The method of claim 1 in which a pair of said treatment-reactivation zones and a single contact material storage zone are employed, each said treatment-reactivation zones being alternately on-stream for treatment and on-stream for reactivation.

6. The method of claim 1 in which a hydrocarbon fluid is subjected to conversion conditions in the presence of a solid contact catalyst.

7. A process for cracking hydrocarbon oils which comprises vaporizing a hydrocarbon oil and passing same upwardly through a first turbulent mass of powdered cracking catalyst at cracking conditions of temperature, pressure and contact time, separating gaseous cracking products from said mass, continuing for a period of time until the quantity of carbonaceous material deposited on the catalyst in said mass attains a predetermined maximum, during said period introducing into said mass additional quantities of hot reactivated powdered cracking catalyst to minimize loss of catalyst activity therein, at the end of said period passing said vaporized oil in contact with a second mass of powdered cracking catalyst in the manner just described, purging hydrocarbons from the first named mass and then passing therethrough a hot oxygen-containing gas under conditions effecting reactivation of the catalyst by oxidation of carbonaceous matter therefrom, during the thus-described reactivation treatment increasing the velocity of reactivation gases to effect entrainment of a substantial proportion of the catalyst mass as a suspension of catalyst particles in hot gases, separating the thus-suspended particles from the hot gases and accumulating same in a third mass of catalyst particles maintained in a fluidized condition by upward flow of fluidizing gases therethrough, utilizing said third mass of catalyst as the source of the aforementioned additional quantities of hot reactivated catalyst introduced into the masses of catalyst employed for cracking said oil, purging said hydrocarbons from said second mass of catalyst at the end of its cracking period, again utilizing for cracking the first said mass of catalyst which has been reactivated and reactivating the said second mass of catalyst in the manner described, and continuing the aforesaid process cyclically with each said first and second masses of catalyst being employed alternately for cracking and reactivation.

8. The process of claim 7 wherein hot reactivated catalyst from said third mass of catalyst is continuously supplied to the vaporized oil prior to its introduction into a mass of catalyst for cracking during each entire cracking period.

9. The process of claim 7 in which each said first and second masses of catalyst is used for cracking for a part of the cracking period without introduction thereto of any hot reactivated catalyst from said third mass, and in which the balance of the cracking period is carried out while introducing said hot reactivated catalyst to said mass.

10. The process of claim 7 in which the said first and second masses of catalyst are cooled from reactivation temperature to cracking temperature prior to introduction of vaporized oil thereto.

11. In the treatment of fluids with a finely divided solid contact material in which treatment the contact material becomes fouled resulting in decreased activity, the fouled contact material is reactivated, and the reactivated material is then reused in said treatment, the improvement which comprises maintaining a fluidized mass of said material within each of a plurality of treatment-reactivation zones, maintaining a fluidized mass of reactivated contact material within a storage zone, passing a fluid to be treated into one of said treatment-reactivation zones containing a predetermined minimum quantity of said contact material in a fluidized state under conditions effecting the desired treatment, introducing into said zone additional quantity of reactivated contact material from said storage zone while passing said fluid therethrough thereby gradually increasing the quantity of contact material within said zone while minimizing the loss in activity of the contact material therein, then when the quantity of contact material within said zone has increased to a predetermined maximum diverting the flow of fluid to be treated into another of said treatment-reactivation zones containing a predetermined minimum quantity of contact material therein, continuing the treatment in said other zone in the manner just described with introduction of reactivated contact material thereinto from the said storage zone, while continuing treatment of said fluid in said another zone effecting reactivation of the contact material in the first said zone by subjecting same to conditions effecting removal of fouling material therefrom, continuing said reactivation of the contact material remaining in said first zone for a sufficient period of time to reactivate same to a desired extent, during said reactivation period transferring a substantial portion of the contact material from said first zone into said storage zone to decrease the quantity of contact material in said first zone to the aforesaid predetermined minimum, and thereafter passing said fluid to be treated into said first zone for treatment therein and repeating the cycle as described.

BURLE F. WOBKER.

REFERENCES CITED

The following references are of record in the file of this patent:

UNITED STATES PATENTS

| Number | Name | Date |
| --- | --- | --- |
| 2,268,187 | Churchill | Dec. 30, 1941 |
| 2,392,957 | Thomas | Jan. 15, 1946 |
| 2,413,271 | Warrick | Dec. 24, 1946 |
| 2,421,616 | Hemminger et al. | June 3, 1947 |
| 2,435,158 | Read | Jan. 27, 1948 |